United States Patent
Eser et al.

(10) Patent No.: US 10,626,808 B2
(45) Date of Patent: Apr. 21, 2020

(54) CONTROLLING FUEL INJECTION IN AN INTERNAL COMBUSTION ENGINE

(71) Applicant: Continental Automotive GmbH, Hannover (DE)

(72) Inventors: Gerhard Eser, Hemau (DE); Erwin Achleitner, Obertraubling (DE); Florian Kleiner, Kehlheim (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/081,363

(22) PCT Filed: Feb. 9, 2017

(86) PCT No.: PCT/EP2017/052882
§ 371 (c)(1),
(2) Date: Nov. 6, 2018

(87) PCT Pub. No.: WO2017/148676
PCT Pub. Date: Sep. 8, 2017

(65) Prior Publication Data
US 2019/0063343 A1    Feb. 28, 2019

(30) Foreign Application Priority Data
Mar. 2, 2016    (DE) .................. 10 2016 203 433

(51) Int. Cl.
*F02D 35/02*    (2006.01)
*F02D 41/40*    (2006.01)
(Continued)

(52) U.S. Cl.
CPC .......... *F02D 35/026* (2013.01); *F02D 41/40* (2013.01); *F02D 41/402* (2013.01);
(Continued)

(58) Field of Classification Search
CPC .. F02D 35/026; F02D 41/402; F02D 41/3023; F02D 41/1446; F02D 41/40;
(Continued)

(56) References Cited

U.S. PATENT DOCUMENTS

| | | | |
|---|---|---|---|
| 4,913,118 A | 4/1990 | Watanabe | 123/435 |
| 5,647,668 A | 7/1997 | Schnaibel et al. | 374/144 |

(Continued)

FOREIGN PATENT DOCUMENTS

| | | | | |
|---|---|---|---|---|
| DE | 4433631 A1 | 3/1996 | | F02D 41/14 |
| DE | 69817273 T2 | 6/2004 | | F02D 21/08 |

(Continued)

OTHER PUBLICATIONS

Korean Office Action, Application No. 2019047454998, 7 pages.
(Continued)

*Primary Examiner* — Hai H Huynh
(74) *Attorney, Agent, or Firm* — Slayden Grubert Beard PLLC

(57) ABSTRACT

Various embodiments include a method for controlling an internal combustion engine comprising: determining a speed of the internal combustion engine; determining a cylinder wall temperature of a combustion cylinder of the internal combustion engine; selecting an injection mode based at least in part on the speed and the cylinder wall temperature; and actuating a fuel injector associated with the combustion cylinder based on the selected injection mode.

18 Claims, 3 Drawing Sheets

(51) Int. Cl.
*F02D 41/14* (2006.01)
*F02D 41/30* (2006.01)

(52) U.S. Cl.
CPC ...... *F02D 41/1446* (2013.01); *F02D 41/3023* (2013.01); *F02D 2200/021* (2013.01); *F02D 2200/022* (2013.01); *F02D 2200/101* (2013.01); *Y02T 10/44* (2013.01)

(58) Field of Classification Search
CPC ......... F02D 2200/101; F02D 2200/021; F02D 2200/022; Y02T 10/44
USPC .................. 123/435, 436; 701/103–105, 110
See application file for complete search history.

(56) References Cited

U.S. PATENT DOCUMENTS

| | | | | |
|---|---|---|---|---|
| 5,983,630 | A | 11/1999 | Kibe et al. | 60/285 |
| 8,235,026 | B2* | 8/2012 | Yamaguchi | F02D 41/0042 123/179.16 |
| 8,667,952 | B2 | 3/2014 | Sanglcyu et al. | 123/299 |
| 8,989,989 | B2* | 3/2015 | Sczomak | F02D 41/14 701/105 |
| 9,695,772 | B2* | 7/2017 | Levy | F02D 41/3836 |
| 9,909,513 | B2* | 3/2018 | Bzymek | F02B 17/005 |
| 10,087,877 | B2* | 10/2018 | Shirahashi | F02B 3/12 |
| 2015/0059691 | A1 | 3/2015 | Hergart et al. | 123/349 |
| 2016/0032857 | A1* | 2/2016 | Wu | F02D 41/221 701/105 |
| 2017/0159584 | A1* | 6/2017 | Yamashita | F02D 41/0002 |
| 2018/0230929 | A1* | 8/2018 | Kitazume | F02D 41/047 |
| 2019/0226419 | A1* | 7/2019 | Zhou | F02B 5/02 |

FOREIGN PATENT DOCUMENTS

| | | | |
|---|---|---|---|
| DE | 102006010094 A1 | 9/2007 | .............. F01N 11/00 |
| DE | 102007006341 A1 | 8/2008 | .............. F02D 41/00 |
| DE | 102008020933 B4 | 7/2014 | .............. F01P 7/00 |
| JP | 11132085 A | 5/1999 | .............. F02D 1/02 |
| JP | 2004353490 A | 12/2004 | .............. F02D 41/04 |
| JP | 2015137543 A | 7/2015 | .............. F02D 41/04 |
| WO | 2017/148676 A1 | 9/1917 | .............. F02D 41/40 |

OTHER PUBLICATIONS

German Office Action, Application No. 102016203433.2, 6 pages, dated Aug. 19, 2016.
International Search Report and Written Opinion, Application No. PCT/EP2017/052882, 15 pages, dated Apr. 24, 2017.
Korean Office Action, Application No. 2019080748777, 7 pages, dated Nov. 7, 2019.

* cited by examiner

CONTROLLING FUEL INJECTION IN AN INTERNAL COMBUSTION ENGINE

CROSS-REFERENCE TO RELATED APPLICATIONS

This application is a U.S. National Stage Application of International Application No. PCT/EP2017/052882 filed Feb. 9, 2017, which designates the United States of America, and claims priority to DE Application No. 10 2016 203 433.2 filed Mar. 2, 2016, the contents of which are hereby incorporated by reference in their entirety.

TECHNICAL FIELD

The present disclosure relates to internal combustion engines. Various embodiments may include a method for controlling fuel injection into a combustion chamber of a cylinder of an internal combustion engine.

BACKGROUND

With the increasing stringency of legal requirements with regard to emissions of limited pollutants, it is necessary for the fuel to be introduced exactly at the correct time and in the ideal manner into the combustion chamber. DE 10 2006 010 094 A1 discloses a method for temperature determination in the exhaust system of an internal combustion engine having a control device, wherein, on the basis of at least one operating variable, a temperature or a temperature profile of an exhaust gas in the exhaust system is calculated from an energy balance.

DE 10 2008 020 933 B4 discloses a method for checking the plausibility of a temperature measurement in an internal combustion engine. DE 44 33 631 A1 discloses a method for forming a signal relating to a temperature in the exhaust system of an internal combustion engine. With the method, it is for example possible for a signal for the exhaust temperature upstream of the catalytic converter, or for a signal for the temperature in the catalytic converter or a signal for the temperature downstream of the catalytic converter, to be formed.

DE 10 2007 006 341 A1 discloses a method for controlling an internal combustion engine in motor vehicles, with determination of various setting parameters by means of an electronic control unit in a manner dependent on operating parameters, wherein the setting parameter is formed from a base value and at least one corrective value, and a corrective value is determined in a manner dependent on an estimated combustion chamber wall temperature.

SUMMARY

The teachings of the present disclosure may provide a reduction in emissions. For example, some embodiments may include a method for ascertaining an injection mode for the injection of a fuel into a combustion chamber of a cylinder of an internal combustion engine, in which method a speed (N) of the internal combustion engine is ascertained, a cylinder wall temperature (ZT) of the cylinder is ascertained, and the injection mode is ascertained in a manner dependent on the speed (N) and the cylinder wall temperature (ZT).

In some embodiments, a piston crown temperature of the cylinder is ascertained, and the injection mode is ascertained in a manner dependent on the piston crown temperature.

In some embodiments, a speed threshold value is predefined, and the injection mode is ascertained in a manner dependent on a comparison of the speed (N) with the speed threshold value.

In some embodiments, if the speed threshold value is undershot, a first injection mode (EM1) is selected, and if the speed threshold value is overshot, a second injection mode (EM2) is selected.

In some embodiments, a cylinder wall temperature threshold value is predefined, and the injection mode is ascertained in a manner dependent on a comparison of the cylinder wall temperature (ZT) with the cylinder wall temperature threshold value.

In some embodiments, if the cylinder wall temperature threshold value is undershot, a first injection mode (EM1) is selected, and if the cylinder wall temperature threshold value is overshot, a second injection mode (EM2) is selected.

In some embodiments, the first injection mode (EM1) is representative of a multiple injection, and the second injection mode (EM2) is representative of a single injection.

In some embodiments, the cylinder wall temperature (ZT) is ascertained by means of a predefined cylinder wall temperature model.

In some embodiments, the cylinder wall temperature model is a thermodynamic temperature model.

In some embodiments, the ascertained cylinder wall temperature (ZT) is representative of a dynamic cylinder wall temperature which is ascertained in a manner dependent on a steady-state cylinder wall temperature.

In some embodiments, the cylinder wall temperature (ZT) is ascertained in a manner dependent on an ascertained cylinder pressure, an ascertained swept volume of the cylinder, an ascertained air mass and an ascertained indicated engine torque.

In some embodiments, the cylinder wall temperature (ZT) is ascertained in a manner dependent on an ascertained exhaust-gas temperature.

In some embodiments, the cylinder wall temperature model comprises the modular intermediate variables of mean gas temperature in the cylinder chamber, indicated mean pressure of the cylinder, heat transfer coefficient in the combustion chamber, and steady-state cylinder wall temperature.

As another example, some embodiments may include an apparatus for ascertaining an injection mode for the injection of a fuel into a combustion chamber of a cylinder of an internal combustion engine, wherein the apparatus is designed to carry out a method as described above.

BRIEF DESCRIPTION OF THE DRAWINGS

Exemplary embodiments of the teachings herein are explained in more detail below by means of the schematic drawings. In the drawings.

Figure 1:
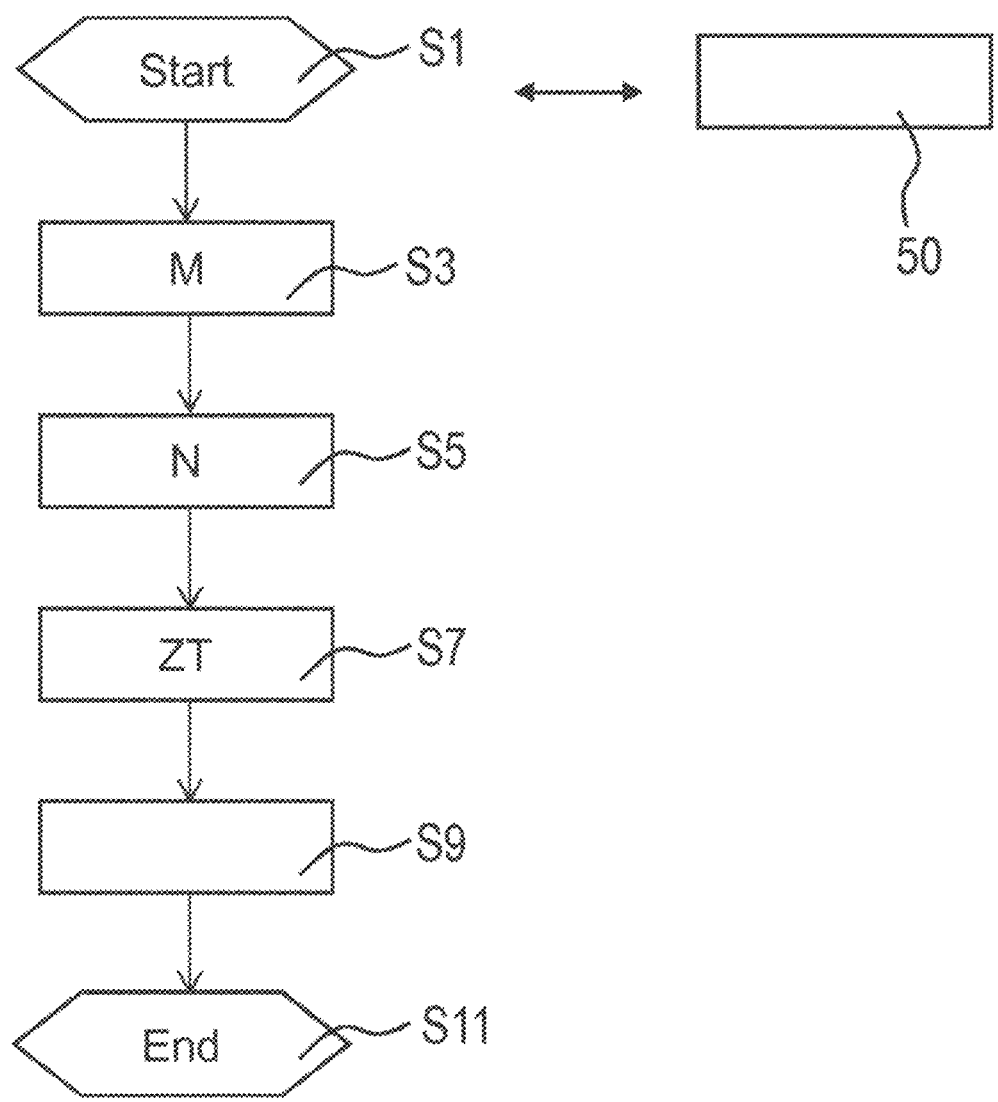
FIG. 1 shows a flow diagram relating to the ascertainment of an injection mode, according to the teachings of the present disclosure.

Elements of the same design or function are denoted by the same reference designations throughout the figures.

DETAILED DESCRIPTION

Various embodiments may include a method for ascertaining an injection mode for the injection of a fuel into a combustion chamber of a cylinder of an internal combustion engine. Some embodiments may include an apparatus for ascertaining an injection mode for the injection of a fuel into a combustion chamber of a cylinder of an internal combustion engine.

In some embodiments, a speed of the internal combustion engine is ascertained. A cylinder wall temperature of the cylinder is ascertained. The injection mode is ascertained in a manner dependent on the speed and the cylinder wall temperature. Subsequently, the injection mode can be set. Here, the injection mode refers to the type of injection. Such injection modes are for example a multiple injection or a single injection. The multiple injection is for example a double injection or a triple injection. Further injection modes are for example a stratified injection for a compression stroke, an intake pipe injection, or a direct injection.

If the injection mode is determined only by parameters such as speed, then this parameter is applicable only to certain combustion chamber temperatures. In the event of a change in the temperature, it is for example the case that the vaporization behavior of the fuel changes, and incomplete combustion occurs. The result is an exceedance of the particle limit values. Alternatively, the injection mode can be ascertained in a manner dependent on a coolant temperature. Said temperature however does not constitute the reference variable that is relevant in the combustion chamber. In particular, modern vehicles have thermal management. The coolant temperature thus only provides limited information about the temperature in the combustion chamber.

By means of the above method, it is possible, through the use of the cylinder wall temperature, to achieve an improvement in emissions, in particular a reduction in the particle count and particle size, in particular in relation to an ascertainment in a manner dependent on the coolant temperature.

In some embodiments, a piston crown temperature of the cylinder is ascertained, and the injection mode is ascertained in a manner dependent on the piston crown temperature. The piston crown temperature can be ascertained for example by means of a suitable model.

In some embodiments, a speed threshold value is predefined, and the injection mode is ascertained in a manner dependent on a comparison of the speed with the speed threshold value. In some embodiments, the injection mode is selected based on a threshold value. For example, if the speed threshold value is undershot, a first injection mode is selected, and if the speed threshold value is overshot, a second injection mode is selected. In this way, a switch between two injection modes is possible in a very simple manner. In some embodiments, further speed threshold values may be used in order to switch between more than two injection modes.

In some embodiments, a cylinder wall temperature threshold value is predefined, and the injection mode is ascertained in a manner dependent on a comparison of the cylinder wall temperature with the cylinder wall temperature threshold value. A very simple ascertainment of the injection mode is possible by means of a threshold value. For example, if the cylinder wall temperature threshold value is undershot, a first injection mode is selected, and if the cylinder wall temperature threshold value is overshot, a second injection mode is selected.

In this way, a switch between two injection modes is possible in a very simple manner. It is optionally also possible for further cylinder wall temperature threshold values to be used in order to switch between more than two injection modes.

The selection of the first or second injection mode may alternatively or additionally take place in a manner dependent on further conditions, such as for example stability conditions and/or a hysteresis.

In some embodiments, the first injection mode is representative of a multiple injection, and the second injection mode is representative of a single injection. Specifically in the event of a load alteration, a switch from a single injection to a multiple injection, in particular to a double injection, is advantageous in order to reduce emissions.

In some embodiments, the cylinder wall temperature is ascertained by means of a predefined cylinder wall temperature model. In this way, no reference sensor is needed. Through the use of a cylinder wall temperature model, the real cylinder wall temperature can be replicated very exactly.

In some embodiments, the cylinder wall temperature model is a thermodynamic temperature model. Specifically with a thermodynamic model which is based for example on the first law of thermodynamics, the real cylinder wall temperature can be replicated very exactly.

In some embodiments, the ascertained cylinder wall temperature is representative of a dynamic cylinder wall temperature which is ascertained in a manner dependent on a steady-state cylinder wall temperature. Through the ascertainment of a dynamic cylinder wall temperature, the thermal inertia of the cylinder head and of the engine block can be taken into consideration, such that the real cylinder wall temperature can be replicated very exactly.

In some embodiments, the cylinder wall temperature is ascertained in a manner dependent on an ascertained cylinder pressure, an ascertained swept volume of the cylinder, an ascertained air mass and an ascertained indicated engine torque. These variables, that is to say the cylinder pressure, the swept volume of the cylinder, the air mass and the indicated engine torque, can be very easily determined by means of normally already existing sensor arrangements and/or by means of engine data, such that, in this way, the cylinder wall temperature can be realized very easily and inexpensively.

In some embodiments, the cylinder wall temperature is ascertained in a manner dependent on an ascertained exhaust-gas temperature. Through the ascertainment in a manner dependent on an ascertained exhaust-gas temperature, the cylinder wall temperature can be determined very exactly. In some embodiments, the cylinder wall temperature may also be ascertained independently of the exhaust-gas temperature, that is to say the exhaust-gas temperature is not necessary for the determination of the cylinder wall temperature. It is thus also the case that no exact modeling of the exhaust-gas temperature, or an exhaust-gas temperature sensor, is needed.

In some embodiments, the cylinder wall temperature model comprises the modular intermediate variables of mean gas temperature in the cylinder chamber, indicated mean pressure of the cylinder, heat transfer coefficient in the combustion chamber, and steady-state cylinder wall temperature. Such a cylinder wall temperature model provides modular physical modeling. It is thus possible for intermediate variables to be determined in a component-dependent manner. This permits straightforward calibration of the cylinder wall temperature, because no multi-dimensional dependencies have to be determined in characteristic maps for the ascertainment of the cylinder wall temperature.

FIG. 1 shows a flow diagram of a program for ascertaining an injection mode. The program may be executed for example by a control apparatus 50. For this purpose, the control apparatus 50 has, in particular, a processing unit, a program and data memory and, for example, one or more communication interfaces. The program and data memory and/or the processing unit and/or the communication interfaces may be formed in a single module and/or may be distributed between several modules. For this purpose, the program, in particular, is stored in the data and program memory of the control apparatus 50. The control apparatus 50 may also be referred to as an apparatus for ascertaining an injection mode for the injection of a fuel into a combustion chamber of a cylinder of an internal combustion engine.

In a step S1, the program is started, and variables are initialized as necessary. In a step S3, a speed N of the internal combustion engine is ascertained. In a step S5, a cylinder wall temperature ZT of the cylinder is ascertained.

In a step S7, the injection mode is ascertained in a manner dependent on the speed N and the cylinder wall temperature ZT. In a step S9, the program is ended, and may be started again in the step S1 as necessary. Alternatively, the program is continued further in the step S3, and is not ended.

Figure 2:
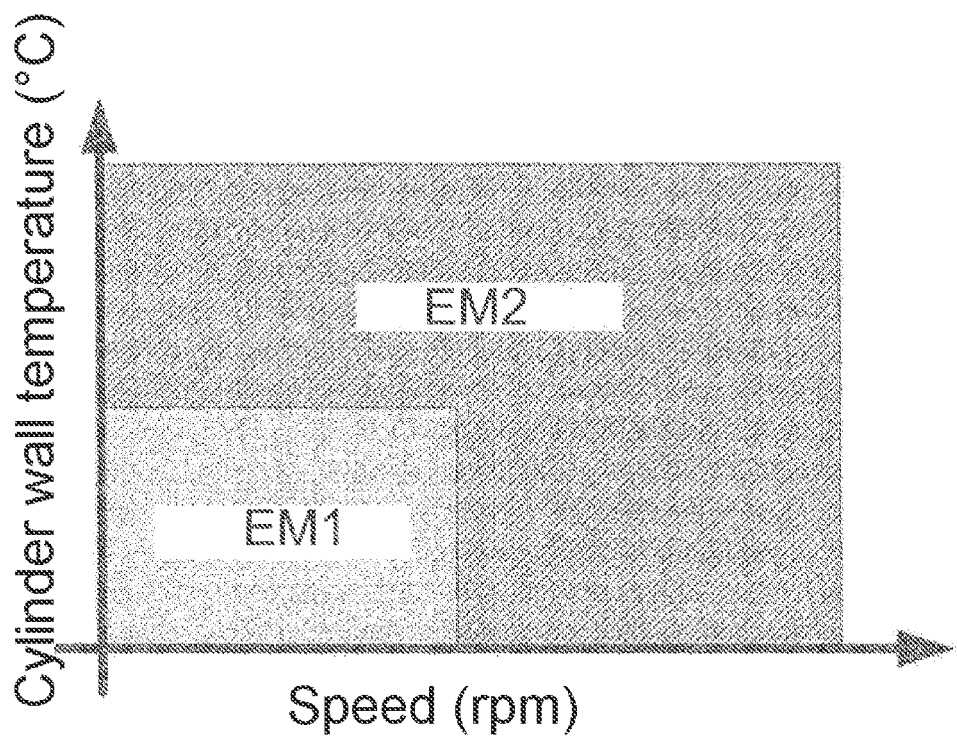
FIG. 2 shows a diagram relating to the selection of the injection mode, according to the teachings of the present disclosure.

FIG. 2 shows a diagram of an exemplary ascertainment of the injection mode, thus in particular of the step S7. For example, a speed threshold value is predefined, and, if the speed threshold value is undershot, a first injection mode EM1 is selected, and if the speed threshold value is overshot, a second injection mode EM2 is selected.

In some embodiments, a cylinder wall temperature threshold value is predefined, and, if the cylinder wall temperature threshold value is undershot, the first injection mode EM1 is selected, and if the cylinder wall temperature threshold value is overshot, the second injection mode EM2 is selected. In some embodiments, in each case yet further threshold values may be predefined in order to select between more than 2 injection modes. The selection of the first or second injection mode EM1, EM2 may alternatively or additionally take place in a manner dependent on further conditions, such as for example stability conditions and/or a hysteresis.

The first injection mode EM1 is for example representative of a multiple injection, and the second injection mode EM2 is representative of a single injection. The multiple injection is for example a double injection or a triple injection. Alternatively, the first injection mode EM1 or the second injection mode EM2 is a stratified injection for a compression stroke, an intake pipe injection or a direct injection.

The cylinder wall temperature ZT is ascertained for example by means of a predefined cylinder wall temperature model. For the ascertainment of the cylinder wall temperature model, it is for example possible for the first law of thermodynamics to be applied:

$$\frac{dU}{dCRK} = \frac{dQ_{fuel}}{dCRK} + \frac{dQ_w}{dCRK} + \frac{dW_t}{dCRK} + \frac{dH_{inlet}}{dCRK} + \frac{dH_{exhaust}}{dCRK} + \frac{dH_{blowby}}{dCRK}.$$

The sum of the heat supplied by means of the fuel $$\frac{dQ_{fuel}}{dCRK} = \frac{dm_{fuel}}{dCRK} * H_U$$

corresponds to the wall heat flow $$\frac{dQ_W}{dCRK} = \sum \alpha_k * A_k * (T_{W,k} - T_{cyl}) * \frac{d_t}{dCRK},$$

the technical work $$\frac{dW_t}{dCRK} = -p_{cyl} \frac{dV_{cyl}}{dCRK},$$

the enthalpy flow entering via inlet valves $$\frac{dH_{inlet}}{dCRK} = \sum_k h_{inlet,k} * \frac{dm_{inlet,k}}{dCRK},$$

the corresponding enthalpy flow exiting via outlet valves $$\frac{dH_{outlet}}{dCRK} = \frac{dm_{outlet,k}}{dCRK} \sum_k h_{A,k} * \frac{dm_{outlet,k}}{dCRK},$$

and the leakage enthalpy flow $$\frac{dH_{blowby}}{dCRK} = h_{blowby} * \frac{dm_{blowby,k}}{dCRK}.$$

As a simplification, this energy balance can be converted for example into a balance of the heat flows. Here, the relationship between the convective heat flow to the cylinder wall temperature, the heat flow transported through the cylinder wall by heat conduction and in turn the heat flow transmitted by convection to the coolant is established:

$$\alpha_G \cdot A_G \cdot (T_G - T_{CW}) = \frac{\lambda_{CW}}{S_{CW}} \cdot A_{CW} \cdot (T_{CW} - T_{CW,cool}) + m_{cyl} \cdot c_{cyl} \cdot \frac{dT_{CW}}{dt} =$$

$$\alpha_{coolant} \cdot A_{cool} \cdot (T_{CW,cool} - T_{cool}).$$

Here, the following abbreviations are used:

$\alpha_G$: mean heat transfer coefficient of the gas side, $A_G$: effective heat flow cross section of the gas side, $T_G$: mean temperature of the gas side (cylinder chamber), $\lambda_{CW}$: thermal conductivity of the combustion chamber wall, $s_{CW}$: (effective) thickness of the combustion chamber wall, $A_{CW}$: effective heat flow cross section of the cylinder wall, $T_{CW}$: mean cylinder wall temperature of the combustion chamber side, $T_{CW,cool}$: mean cylinder wall temperature of the coolant side, $\alpha_{coolant}$: heat transfer coefficient of the coolant, $A_{cool}$: effective area of the coolant side, $T_{cool}$: coolant temperature, $M_{cyl}$: effective mass of the cylinder, $C_{cyl}$: specific heat capacity of the cylinder.

From this, a calculation model for the steady-state situation can be derived, which model is composed in principle of three parts. The first part is the determination of the gas-side model parameters. The third part is concerned with calculations from the thermal management. In the second part, said calculations are brought together by means of the calculation of the wall transitions.

$$\alpha_G A_G (T_G - T_{CW}) =$$
$$\frac{\lambda_{CW}}{d_{CW}} A_{CW}(T_{CW} - T_{CW,cool}) = \alpha_{coolant} A_{cool}(T_{CW,cool} - T_{cool})$$

The mean gas temperature $T_G$ can be calculated with the knowledge of the cylinder pressure $P_{cyl}$, the swept volume $V_{cyl}$, the air mass MAF and the gas constant R:

$$T_G = \frac{P_{cyl} \cdot V_{cyl}}{MAF \cdot R} \cdot a_1 + T_{in} \cdot a_2.$$

Here, the inlet temperature $T_{in}$ must be taken into consideration. The parameters a1 and a2 must be empirically determined. Optionally, the exhaust-gas temperature may also be incorporated in weighted form into the equation by means of the parameter a3. The gas temperature may also be corrected using the lambda value, because the combustion temperature is relatively cool at lambda values < >1.

The indicated mean pressure $P_{cyl}$ is calculated using the indicated engine torque TQI and the swept volume $V_{cyl}$ $$P_{cyl} = \frac{4 \cdot \pi \cdot TQI}{V_{cyl}}.$$

The calculation of the heat transfer coefficient $\alpha_G$ in the combustion chamber may, according to Woschni, be determined as follows:

$$\alpha_G = 130 \cdot B^{-0.2} \cdot P_{cyl}^{0.8} \cdot T_G^{-0.53} \cdot v_G^{0.8}.$$

The speed of the charge movement is, in the first approach, approximated on the basis of the piston speed. In some embodiments, it is also possible for the charge movement resulting from swirl, tumble etc. to be taken into consideration. The thermal management of an internal combustion engine is highly complex owing to a multiplicity of hydraulic control elements (various pumps and switching valves). It is thus advantageous to resort to simplified models or estimations.

One approach is dimensional analysis, for example by means of regression analysis on the basis of the Levenberg-Marquardt algorithm. On the basis of this empirical approach, the coolant speed and the kinematic viscosity can be estimated. This dependency may be approximated as a polynomial or as a characteristic map in the engine controller. The Reynolds number $Re_k$ can subsequently be calculated from the internal diameter $D_i$ of the cooling channel and the coolant speed $v_{coolant}$, and the kinematic viscosity n. The kinematic viscosity n is an expression for the internal friction of a liquid. The kinematic viscosity is the quotient of the dynamic viscosity and of the density of the liquid.

$$Re_k = \frac{D_i \cdot v_{coolant}}{n}$$

The Prandtl number exhibits an intense temperature dependency and may also be determined as a polynomial expansion or with the aid of a characteristic map. From the Prandtl number and the Reynolds number, the Nusselt number can be ascertained.

From the Nusselt number $Nu_{coolant}$, the thermal conductivity of the coolant λ and the diameter of the cooling channel $D_i$, the heat transfer coefficient $\alpha_{coolant}$ can be calculated $$\alpha_{coolant} = \frac{Nu_{coolant} \cdot \lambda}{D_i}.$$

As a final step, from these intermediate variables, the steady-state cylinder wall temperature $T_{cyl,stat}$ is determined $$T_{cyl,stat} = \frac{\alpha_G \cdot T_G + U \cdot T_{cool}}{\alpha_G + U}.$$

Here, U represents the substitute thermal conductivity value $$U = \frac{\alpha_G \cdot (T_G - T_{CW})}{T_{CW} - T_{cool)}}.$$

For the determination of the dynamic cylinder wall temperature $T_{cyl}$, the thermal inertia of the cylinder head must also be taken into consideration. Here, the parameter k is ascertained from the effective thermal mass of the cylinder and the specific heat capacity $$T_{cyl} = (T_{cyl,stat} - T_{cyl,old}) \cdot k + T_{cyl,old}.$$

$T_{cyl,old}$ denotes in this case the dynamic cylinder temperature from a preceding calculation cycle.

Figure 3:
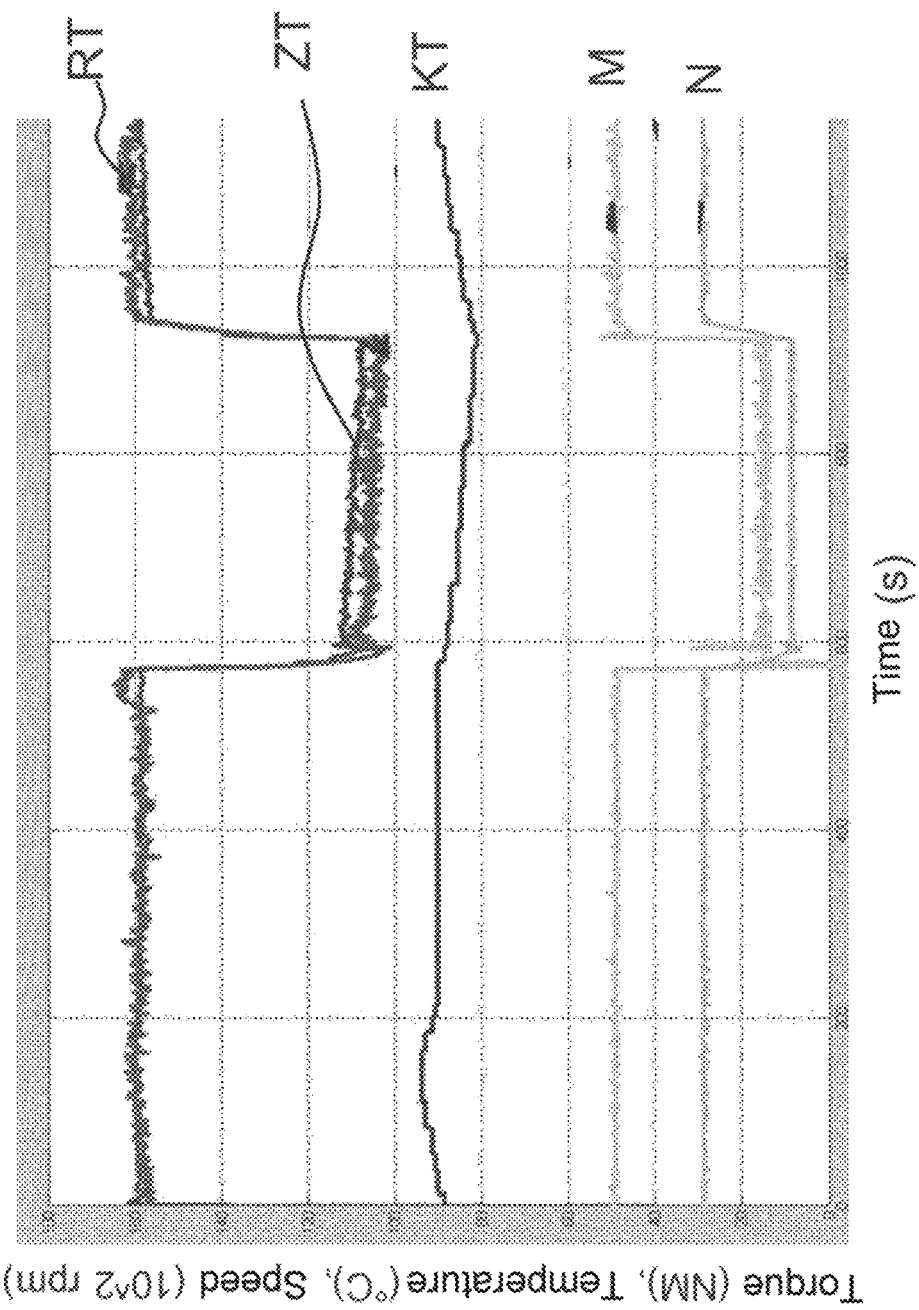
FIG. 3 shows a graph with values of ascertained cylinder wall temperatures, according to the teachings of the present disclosure.

FIG. 3 shows a graph with values of ascertained cylinder wall temperatures ZT. The uppermost two lines are representative of the (dynamic) cylinder wall temperature ZT ascertained by means of the above cylinder wall model and a reference temperature RT ascertained by means of a sensor arrangement. Here, the reference temperature RT is the line with the more pronounced noise. The third line from the top is representative of the coolant temperature KT. The fourth line from the top is representative of the torque M, and the fifth line is representative of the speed N.

As can be seen in FIG. 3, the dynamic cylinder wall temperature ZT follows the reference temperature RT in the illustrated transient situation, whereas the coolant temperature KT falls only very slowly.

It is thus possible, through the use of the cylinder wall temperature ZT, to achieve an improvement in emissions in particular with regard to the particle count and particle size, in particular in relation to an ascertainment in a manner dependent on the coolant temperature KT. If the cylinder wall temperature ZT is ascertained independently of the exhaust-gas temperature, then no exact modeling of the exhaust-gas temperature, or an exhaust-gas temperature sensor, is needed. An advantage of the above-described cylinder wall temperature model lies in the modular physical modeling. It is thus possible for intermediate variables to be determined in a component-dependent manner. This permits straightforward calibration of the cylinder wall temperature ZT, because no multi-dimensional dependencies have to be determined in characteristic maps for the ascertainment of the cylinder wall temperature ZT.

In some embodiments, a piston crown temperature of the cylinder may be ascertained, and the injection mode may be ascertained in a manner dependent on the piston crown temperature. The piston crown temperature may for example likewise, similarly to the cylinder wall temperature, be ascertained by means of a suitable model. In particular, it is thus optionally also possible, in a manner dependent on the cylinder wall temperature and the piston crown temperature, for an overall temperature value to be ascertained and compared with a temperature threshold value, instead of the comparison of the cylinder wall temperature with the cylinder wall temperature threshold value.

LIST OF REFERENCE DESIGNATIONS

S1-S9 Steps
50 Control apparatus
EM1 First injection mode
EM2 Second injection mode
KT Coolant temperature
M Torque
N Speed
RT Reference temperature
ZT Cylinder wall temperature

What is claimed is:

1. A method for controlling an internal combustion engine, the method comprising:
   determining an engine speed of the internal combustion engine;
   calculating a cylinder wall temperature of a cylinder wall of a combustion cylinder of the internal combustion engine by a process including:
      calculating a cylinder gas temperature of the combustion cylinder; and
      calculating a cylinder wall temperature of the combustion cylinder as a function of the calculated cylinder gas temperature;
   selecting an injection mode based at least in part on the engine speed and the cylinder wall temperature; and
   actuating a fuel injector associated with the combustion cylinder based on the selected injection mode.

2. The method as claimed in claim 1, further comprising:
   determining a piston crown temperature of the combustion cylinder; and
   selecting the injection mode based at least in part on the engine speed, the cylinder wall temperature, and the piston crown temperature.

3. The method as claimed in claim 1, wherein selecting the injection mode includes comparing the determined engine speed with a predetermined speed threshold value.

4. The method as claimed in claim 3, wherein selecting the injection mode comprises:
   if the engine speed is below the speed threshold value, selecting a first injection mode; and
   if the engine speed is above the speed threshold value, selecting a second injection mode.

5. The method as claimed in claim 1, wherein selecting the injection mode includes comparing the cylinder wall temperature with a predetermined cylinder wall temperature threshold value.

6. The method as claimed in claim 5, wherein selecting the injection mode comprises:
   if the cylinder wall temperature is below the cylinder wall temperature threshold value, selecting a first injection mode; and
   if the cylinder wall temperature is above the cylinder wall temperature threshold value, selecting a second injection mode.

7. The method as claimed in claim 1, wherein selecting the injection mode based at least in part on the engine speed and the cylinder wall temperature comprises selecting between:
   a first injection mode that includes more than one injection per cycle; and
   a second injection mode that includes only a single injection per cycle.

8. The method as claimed in claim 1, wherein calculating the cylinder wall temperature includes using a predefined cylinder wall temperature model.

9. The method as claimed in claim 8, wherein the cylinder wall temperature model comprises a thermodynamic temperature model.

10. The method as claimed in claim 8, wherein the calculated cylinder wall temperature represents a dynamic cylinder wall temperature based on a steady-state cylinder wall temperature.

11. The method as claimed in claim 1, wherein calculating the cylinder gas temperature comprises calculating the cylinder gas temperature based on an ascertained cylinder pressure, an ascertained swept volume of the cylinder, an ascertained air mass, and an ascertained indicated engine torque.

12. The method as claimed in claim 1, wherein:
   the cylinder gas temperature represents a temperature of gas in the cylinder chamber; and
   calculating the cylinder gas temperature comprises:
      determining an exhaust-gas temperature, and
      calculating the cylinder gas temperature as a function of the determined exhaust-gas temperature.

13. The method as claimed in claim 1, wherein determining the cylinder wall temperature comprises:
   calculating a mean pressure in the cylinder,
   calculating the cylinder gas temperature based on the calculated mean pressure in the cylinder,
   calculating a steady-state cylinder wall temperature based on a heat transfer coefficient in the combustion chamber and the cylinder gas temperature, and
   calculating a dynamic cylinder wall temperature based on the steady-state cylinder wall temperature.

14. The method as claimed in claim 1, comprising calculating the cylinder wall temperature of the cylinder wall of the combustion cylinder as a function of the calculated cylinder gas temperature and a mean heat transfer coefficient.

15. The method as claimed in claim 1, wherein selecting the injection mode based at least in part on the engine speed and the cylinder wall temperature comprises:
   comparing the engine speed with a predetermined speed threshold value;
   comparing the cylinder wall temperature to a cylinder wall temperature threshold value;
   if (a) the engine speed is below the predetermined speed threshold value and (b) the cylinder wall temperature is below the cylinder wall temperature threshold value, selecting a first injection mode; and
   if either (a) the engine speed is above the predetermined speed threshold value or (b) the cylinder wall temperature is above the cylinder wall temperature threshold value, selecting a second injection mode.

16. An apparatus for controlling an internal combustion engine, the apparatus comprising:
   a processing unit;
   a program;
   a data memory; and
   a communication interface;

wherein the program, when executed by the processing unit:
  determines an engine speed of the internal combustion engine;
  calculates a cylinder wall temperature of a combustion cylinder of the internal combustion engine by an algorithm including:
    calculating a cylinder gas temperature of the combustion cylinder; and
    calculating a cylinder wall temperature of a cylinder wall of the combustion cylinder as a function of the calculated cylinder gas temperature;
  selects an injection mode based at least in part on the engine speed and the cylinder wall temperature; and
  actuates a fuel injector associated with the combustion cylinder based on the selected injection mode.

17. The apparatus as claimed in claim 16, wherein selecting the injection mode based at least in part on the engine speed and the cylinder wall temperature comprises selecting between:
  a first injection mode that includes more than one injection per cycle; and
  a second injection mode that includes only a single injection per cycle.

18. The apparatus as claimed in claim 16, wherein selecting the injection mode based at least in part on the engine speed and the cylinder wall temperature comprises:
  comparing the engine speed with a predetermined speed threshold value;
  comparing the cylinder wall temperature to a cylinder wall temperature threshold value;
  if (a) the engine speed is below the predetermined speed threshold value and (b) the cylinder wall temperature is below the cylinder wall temperature threshold value, selecting a first injection mode; and
  if either (a) the engine speed is above the predetermined speed threshold value or (b) the cylinder wall temperature is above the cylinder wall temperature threshold value, selecting a second injection mode.

* * * * *